United States Patent
Johnson et al.

(10) Patent No.: US 9,379,976 B2
(45) Date of Patent: *Jun. 28, 2016

(54) FCOE VN_PORT TO FC N_PORT OPERATIONS IN AN ETHERNET FABRIC

(71) Applicant: Brocade Communications Systems, Inc., San Jose, CA (US)

(72) Inventors: Howard Johnson, Louisville, CO (US); Daniel Chung, San Jose, CA (US); Glenn Wenig, Pleasanton, CA (US); Dave Peterson, Princeton, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/206,879

(22) Filed: Mar. 12, 2014

(65) Prior Publication Data

US 2014/0269745 A1 Sep. 18, 2014

Related U.S. Application Data

(60) Provisional application No. 61/780,700, filed on Mar. 13, 2013.

(51) Int. Cl.
*H04L 12/741* (2013.01)
*H04L 12/933* (2013.01)
*H04L 12/931* (2013.01)

(52) U.S. Cl.
CPC .............. *H04L 45/745* (2013.01); *H04L 49/10* (2013.01); *H04L 49/15* (2013.01); *H04L 49/351* (2013.01); *H04L 49/357* (2013.01)

(58) Field of Classification Search
None
See application file for complete search history.

(56) References Cited

U.S. PATENT DOCUMENTS

| | | | |
|---|---|---|---|
| 7,707,309 B2 | 4/2010 | Shanbhag et al. | |
| 7,760,717 B2 | 7/2010 | Atkinson | |
| 2009/0245791 A1 | 10/2009 | Thaler | |
| 2011/0268120 A1 | 11/2011 | Vobbilisetty | |
| 2011/0268125 A1 | 11/2011 | Vobbilisetty | |
| 2011/0286357 A1 | 11/2011 | Haris | |
| 2011/0292947 A1 | 12/2011 | Vobbilisetty | |
| 2011/0299391 A1 | 12/2011 | Vobbilisetty | |
| 2011/0299535 A1 | 12/2011 | Vobbilisetty | |
| 2012/0155469 A1* | 6/2012 | Majumdar et al. | 370/392 |
| 2012/0163391 A1* | 6/2012 | Shukla et al. | 370/401 |
| 2012/0163395 A1* | 6/2012 | Shukla et al. | 370/409 |
| 2013/0148663 A1* | 6/2013 | Xiong | 370/392 |
| 2014/0003440 A1* | 1/2014 | Hathorn | 370/401 |

OTHER PUBLICATIONS

Juniper Networks, Understanding FIP Implementation, Juniper website, Mar. 23, 2012, pp. 1-3.
Juniper Networks, FCOE Convergence at the Access Layer with Juniper Networks QFX3500 Switch, Jul. 2011, pp. 1-14.
Hewlett-Packard Development Corp., L.P., HP 5920 & 5900 Switch Series FCoE Configuration Guide, Jan. 30, 2013, pp. 1-104.
Hewlett-Packard Development Corp., L.P., HP 5920 & 5900 Switch Series FCoE Configuration Guide, Dec. 23, 2013, pp. 1-116.

(Continued)

*Primary Examiner* — Brandon Renner
(74) *Attorney, Agent, or Firm* — Blank Rome, LLP

(57) ABSTRACT

Ethernet Fabric devices all act as FCoE to FC gateways, so that the Ethernet Fabric itself is considered a virtual FCoE to FC gateway. Further, the Ethernet Fabric allows direct routing of FCoE packets from one FCoE device coupled to the Ethernet Fabric to another FCoE device coupled to the Ethernet Fabric.

20 Claims, 9 Drawing Sheets

(56) References Cited

OTHER PUBLICATIONS

Hewlett-Packard Development Corp., L.P., HP 5920 & 5900 Switch Series FCand FCoE Configuration Guide, Jan. 17, 2014, pp. 1-244.
Hewlett-Packard Development Corp., L.P., HP 5920 & 5900 Switch Series FCoE Command Reference, Jan. 10, 2013, pp. 1-96.
Hewlett-Packard Development Corp., L.P., HP 5920 & 5900 Switch Series FCoE Command Reference, Dec. 23, 2013, pp. 1-97.
Hewlett-Packard Development Corp., L.P., HP 5920 & 5900 Switch Series FCoE Command Reference, Jan. 17, 2014, pp. 1-141.
Fibre Channel—Fabric Generic Requirements (FC-FG), ANSI X3.289-1996, Dec. 4, 1996, pp. Front cover—23.
Fibre Channel Switch Fabric—6 (FC-SW-6) Rev 1.4, Nov. 26, 2013, pp. Front cover—33, 269-319.
Fibre Channel Backbone—6 (FC-BB-6) Rev. 2.00, Dec. 3, 2013, pp. Front cover—32, 87-164, 166.

* cited by examiner

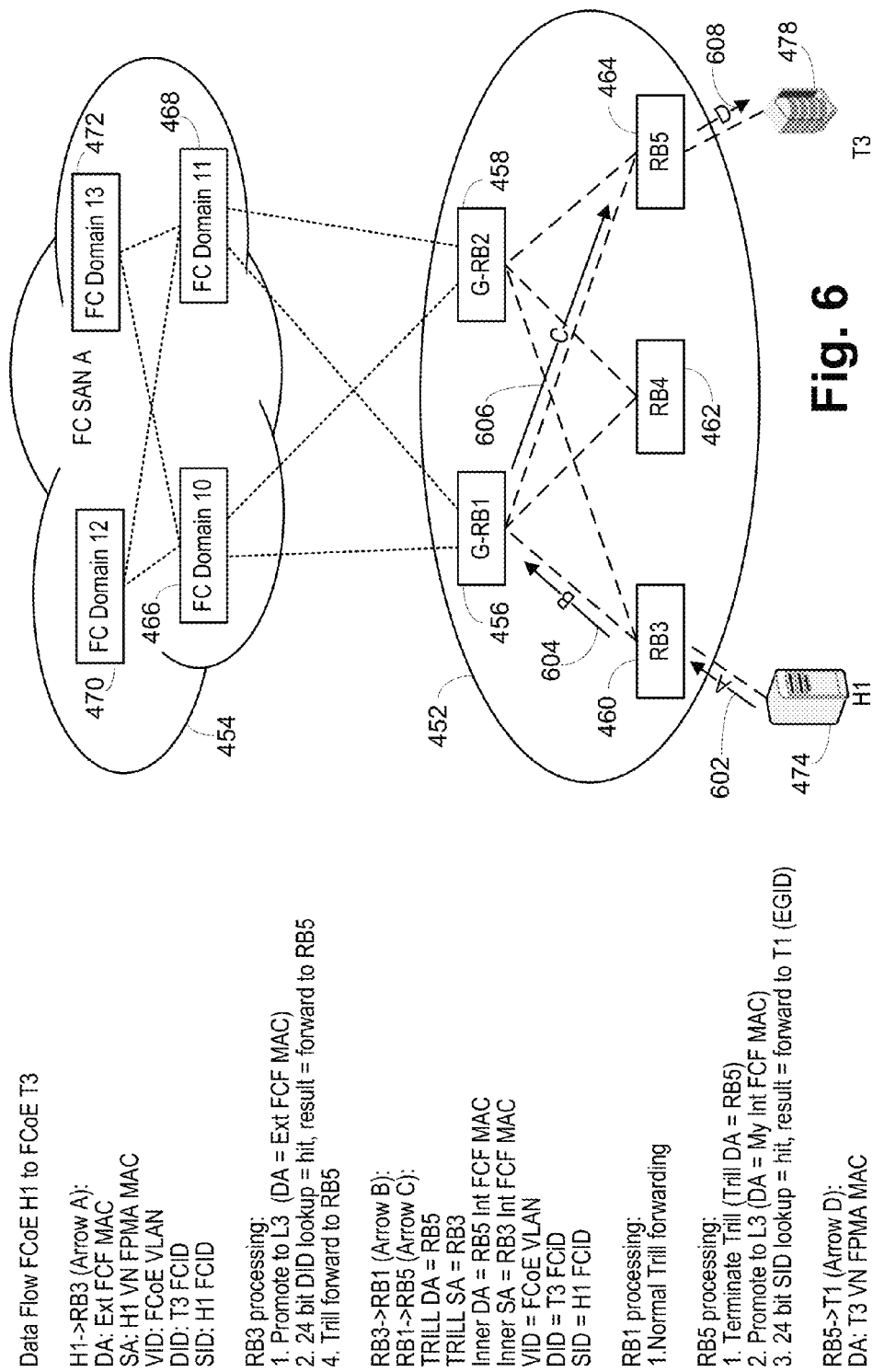

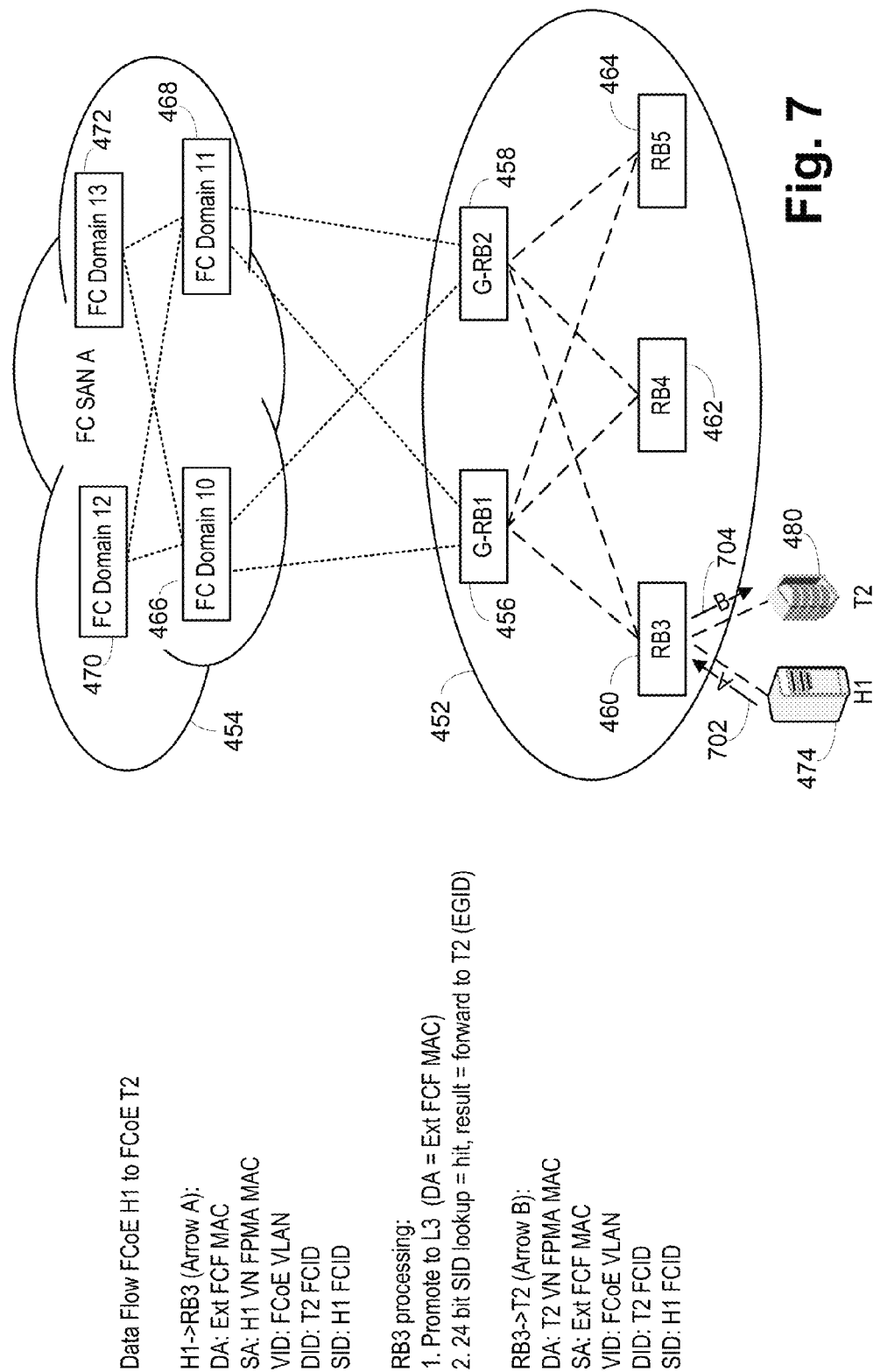

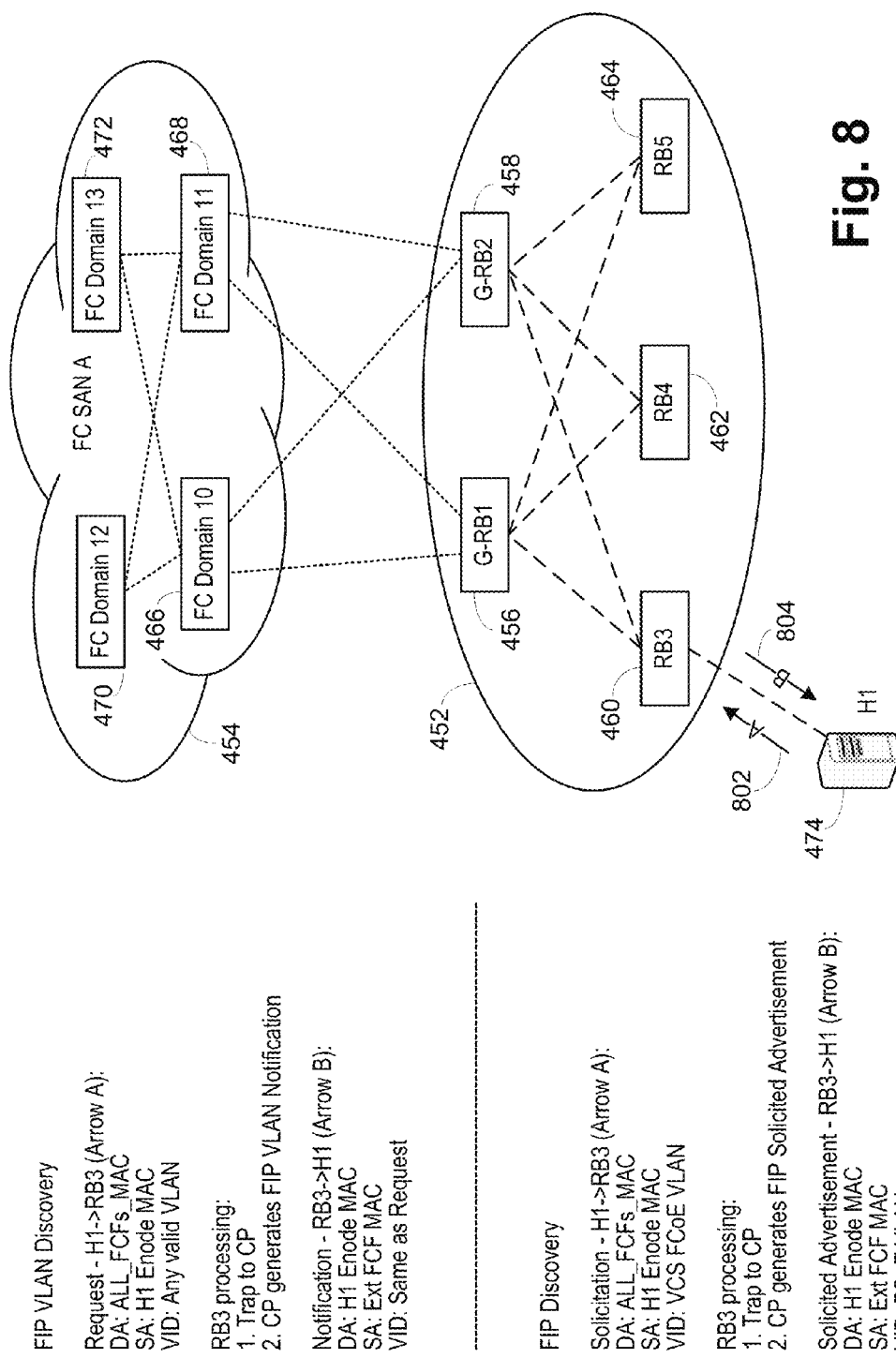

FIP VLI Login (FLOGI or FDISC)
Assume H1 logging into FC Domain 11,
Port 2

VLI Request - H1->RB3 (Arrow A):
DA: Ext FCF MAC
SA: H1 Enode MAC
VID: FCoE VLAN
DID: FFFFFE
SID: 000000

RB3 processing:
1. Trap to CP (FIP etype trap)
2. Use Login Mgmt to determine egress RB
3. TRILL forward to egress RB RB3->RB2 (Arrow B):
TRILL DA = RB2
TRILL SA = RB3
Inner DA = RB2 Int FCF MAC
Inner SA = H1 Enode MAC
VID = FCoE VLAN
DID: FFFFFE
SID: 000000

RB2 login processing:
1. Normal FCoE-FC AG FLOGI/FDISC processing

RB2->FC Domain 11 (Arrow C):
FC FDISC (AG function converts FLOGI to FDISC)

FC Domain 11->RB2 (Arrow D):
FC LS-ACC (successful login) or
FC LS-RJT

RB2 response processing:
1. Normal FCoE-FC AG FLOGI/FDISC processing

RB2->RB3 (Arrow E)
TRILL DA = RB3
TRILL SA = RB2
Inner DA = H1 Enode MAC
Inner SA = RB2 Int FCF MAC
VID = FCoE VLAN
DID: H1 FCID
SID: FFFFFE RB3 response processing
1. Trap to CP (FIP etype trap)
2. Decode response
3a: If LS_ACC, send ENS update to all RBs (Arrow F)

All RBs:
3a.1. Normal MAC addr update processing
3a.2. New FCoE VN-port processing – add FCOE EXM entry using low order 3 bytes of VN-port MAC address as FCID Forward response to H1
VLI Response – RB3->H1 (Arrow G):
DA: H1 ENode MAC
SA: Ext FCF MAC
VID: FCoE VLAN
DID: H1 FCID
SID: FFFFFE

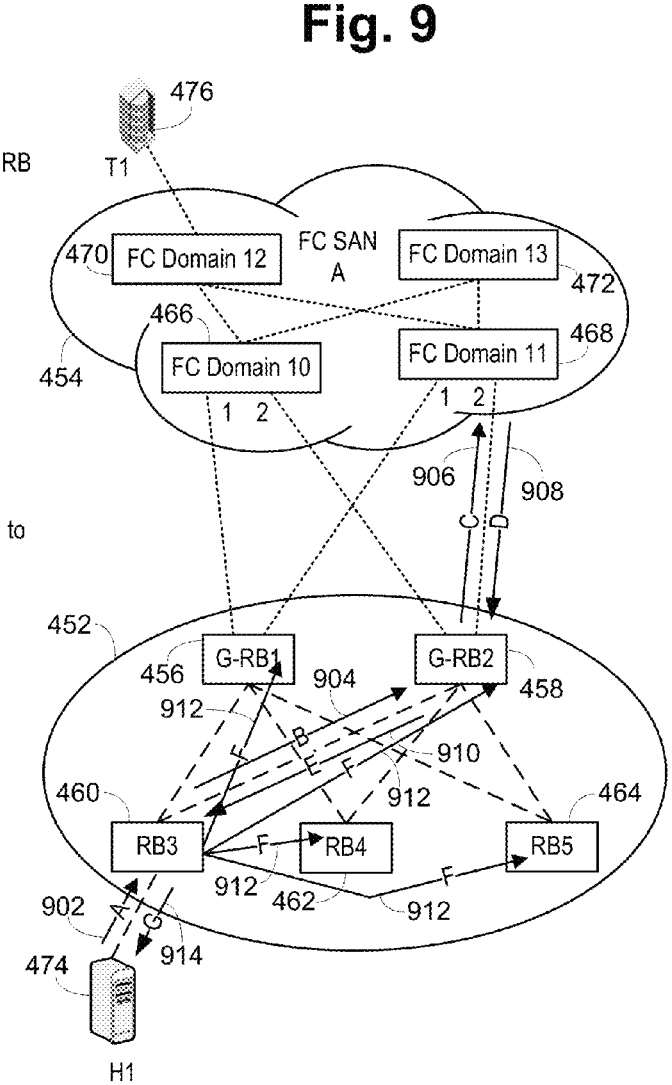

Fig. 9

1. Single external FCF MAC for Ethernet Fabric. Programmed as a "Ext FCF MAC" on all RBs in Ethernet Fabric.
2. Ethernet Fabric switches use internal FCF MAC for ingress RB to egress RB/AG FCoE traffic.

FCOE VN_PORT TO FC N_PORT OPERATIONS IN AN ETHERNET FABRIC

CROSS REFERENCE TO RELATED APPLICATIONS

This application claims the benefit under 35 U.S.C. §119 (e) of U.S. Provisional Patent Application Ser. No. 61/780, 700 entitled "FCoE VN_port to FC N_port Operations in an Ethernet Fabric," filed Mar. 13, 2013, which is hereby incorporated by reference.

This application is related to patent application Ser. No. 14/206,946, filed concurrently herewith, entitled "FCoE VN_Port Virtualizer," which is hereby incorporated by reference.

BACKGROUND OF THE INVENTION

1. Field of the Invention

The invention relates to network devices.

2. Description of the Related Art

One limitation of Fibre Channel (FC) is the practical number of domains or switches that can be present in a fabric. Another concern with FC is the amount of time required to reconfigure the fabric on removal or addition of a new switch. To address these points, a system and method as described in U.S. Pat. No. 7,707,309, entitled "Isolation Switch for Fibre Channel Fabrics in Storage Area Networks" was developed. In that design a switch is connected to hosts in the usual manner but is connected to an FC fabric using N_Port ID Virtualization (NPIV) ports, with one NPIV address for each connected host. The switch translated addresses between those provided to the host and those assigned using the NPIV process. U.S. Pat. No. 7,577,134, entitled "Port Expander for Fibre Channel Fabrics in Storage Area Networks" improved on the design of the '309 patent by passing the NPIV addresses directly to the connected hosts, removing the translation step.

Another concern in FC has been the relatively high cost of the host bus adapters (HBAs) and the switches, particularly as compared to the corresponding Ethernet network interface cards (NICs) and switches and routers. To that end a technology called Fibre Channel over Ethernet (FCoE) has been developed. Basically an FC packet is encapsulated in an Ethernet packet and transferred through a data center Ethernet network. In an FCoE environment, a host or Enode uses either a converged network adapter (CNA), which receives FC packets and encapsulates them itself, or an FCoE driver, which receives the FC packets, converts them to FCoE packets and then provides those to a normal NIC. The FCoE packets are provided to a Fibre Channel Forwarder (FCF), which is a device that is connected to both the Ethernet network and an FC fabric. The FCF receives FCoE packets, converts them to FC packets and then provides them to the FC fabric using an E_Port or fabric port. The FCF acts as a normal FC switch, performing fabric login operations and the like and consumes a domain. In the opposite direction, from storage device to host, the FCF receives the FC packets from the storage unit, converts them to FCoE packets and provides them to the Ethernet network, where they are delivered to the host. The FCoE subsystem of the host, either a CNA or a driver and NIC, convert the FCoE packets to FC packet data, which the host then processes. While this approach addresses a cost issue, it does nothing to address the number of switches problem of FC as each FCF consumes another domain.

One approach to address that concern has been the development of the FCoE to FC gateway, essentially the combination of an FCF and the above mentioned Port Expander. The FCoE to FC gateway connects to the FC fabric using NPIV ports, as discussed above. The FCF portion of the gateway terminates the FCoE network by providing a VF_Port. Internally the FC packets are obtained but then they are provided to the NPIV port for transmission through the FC fabric. The FC portion of the gateway behaves just as the NPIV port of the port expander, except that it is connected internally to an FCoE port rather than an F_Port. This addresses the domain count concern but still requires each FCoE packet to be routed through the Ethernet network to the specific FCoE to FC gateway, as only that one unit has the needed information to perform the necessary packet operations.

In a different area, the number of hosts used in a data center has been increasing dramatically, particularly with the advent of virtual machine (VM) usage. As each VM consumes a MAC address and usually an IP address, transferring packets inside a data center has been problematic as complex router structures are needed to handle the very large number of IP addresses, as only 256 IP addresses can be present on one subnet. These 256 IP addresses can easily be met by a single blade server chassis. The very large number of addresses or connections, virtual or physical, also creates fundamental routing problems as Ethernet uses a spanning tree protocol (STP) for routing to prevent loops. However, using STP results in many non-optimal routes and difficulty in providing load balancing and multipath benefits. To address these issues Ethernet Fabrics have been developed, primarily based on TRILL, to handle the routing at the layer 2 level and to allow load balancing, multipathing and optimal or shortest path routing. One such Ethernet Fabric is the VCS architecture provided by Brocade Communications Systems, Inc.

If an FCoE to FC gateway is used with an Ethernet Fabric, the single point of connection, the FCoE to FC gateway, remains a problem and to an extent reduces the value of the basic improvements provided by the Ethernet Fabric.

A problem that has developed in FCoE and has not been resolved despite many attempts, is the handling of peer-to-peer FCoE communication. For various reasons, in an FCoE environment that includes an FC fabric, all packets must travel to the FC fabric. Thus, any FCoE packet intended for another FCoE device on the same Ethernet network must still travel to the FC fabric and then back. Much debate has occurred, but an acceptable problem has not been determined.

SUMMARY OF THE INVENTION

Embodiments according to the present invention use an Ethernet Fabric for two additional purposes. First, the Ethernet Fabric devices all act as FCoE to FC gateways, so that the Ethernet Fabric itself is considered a virtual FCoE to FC gateway. Second, the Ethernet Fabric allows direct routing of FCoE packets from one FCoE device coupled to the Ethernet Fabric to another FCoE device coupled to the Ethernet Fabric without having to go to the FC fabric and back.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 6 is a block diagram illustrating FCoE VN_Port to FCoE VN_Port on different VCS RB operations according to the present invention.

FIG. 7 is a block diagram illustrating FCoE VN_Port to FCoE VN_Port on same VCS RB operations according to the present invention.

FIG. 8 is a block diagram illustrating FIP Discovery operations according to the present invention.

FIG. 9 is a block diagram illustrating FIP VLI operations according to the present invention.

DETAILED DESCRIPTION OF THE PREFERRED EMBODIMENTS

Figure 1:
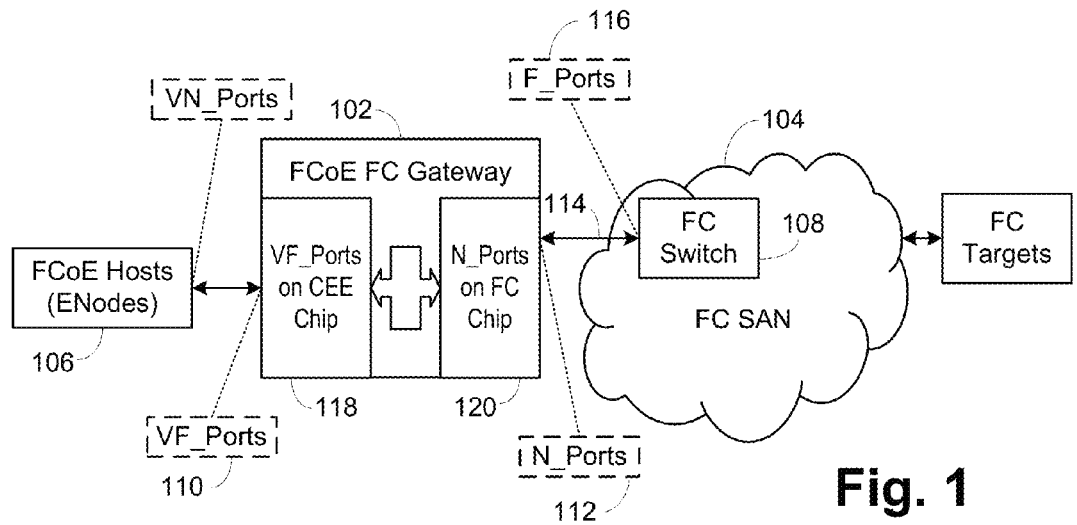
FIG. 1 is a block diagram of an FCoE to FC gateway.

As shown in FIG. 1, an FCoE Switch 102 in FC Gateway mode (FFG: FCoE FC Gateway) connects to an FC fabric or storage area network (SAN) 104 and runs a limited lightweight stack of FC services without using additional domains, dedicated or shared, from the SAN 104. An FFG 102 terminates FCoE virtual links and extends fabric services provided by the FC SAN 104 to attached devices, all without requiring the use of new domains.

Besides domain preservation, an FFG 102 provides topology flexibility. FCoE ENode devices 106 can be moved between FC SAN switches 108 without re-cabling the device connections. Since one FFG 102 can connect to multiple FC SAN switches 108, the devices connected to the FFG 102 can be moved across these switches just by changing software user configuration.

An FFG 102 works as a pass-through-module between ENode devices 106 attached to it and the FC SAN switch 108 to which it connects. The ENode devices 106 do not directly log into the FFG 102, rather the FFG 102 converts the FCoE Initialization Protocol YIN logins to FC logins and forwards the FC logins to the attached FC switch 108. The port types supported on the FFG 102 are VF_Ports no and N_Ports 112. VF_Ports no are created logically on top of physical CEE interfaces and provide login services to the attached devices and the FFG 102 forwards these logins over the FC Links 114 to the FC switch 108. These FC links 114 consist of N_Ports 112 on the FFG 102 connecting to F_Ports 116 on the FC fabric switch 108. There are no E_Ports on the FFG 102 in selected embodiments. VF_Ports no on the FFG 102 support NPIV capability in their own right, which provides potential for two levels of NPIV, one to the VF_Port no and one to the F_Port 116.

User defined mappings associate VF_Ports 110 with N_Ports 112 on the FFG 102. Since N_Ports 112 have a 1:1 physical connection to F_Ports 116 on the FC Fabric switch 108, this VF—N association on the FFG 102 determines which fabric switch F_Port 116 an ENode device 106 logs into. An N_Port 112 on the FFG 102 logs into the FC fabric switch 108 F_Port 116 as a base NPIV device and gets assigned an FC_ID. The ENode devices 106 on the FFG 102 which login through this N_Port 112 are treated as subsequent NPIV logins on the FC switch 108 F_Port 116. Thus, the ENode devices 106 obtain their FC_IDs from the FC switch 108 F_Port 116.

Device FIP F Port Logins (FLOGIs) received on VF_Ports no are trapped and sent to an FC fabric switch 108 as FDISCs (Discover F Port Parameters). Thus, each fabric F_Port 116 receives an FLOGI sent by the FFG 102 N_Port 112 and then subsequent FDISCs sent on behalf of the ENode devices 106. The FIP and FLOGI exchange over an FFG 102 is outlined in FIG. 2.

Figure 2:
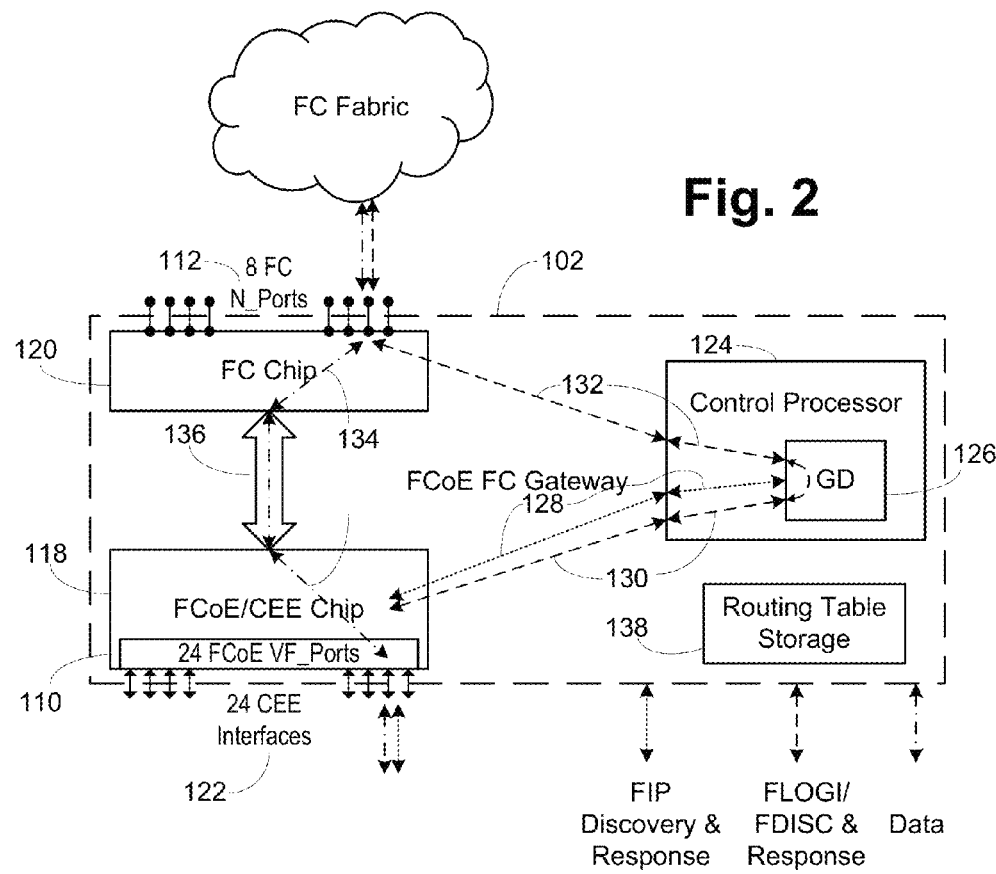
FIG. 2 is a block diagram of the information flow in the FCoE to FC gateway of FIG. 1.
Figure 3:
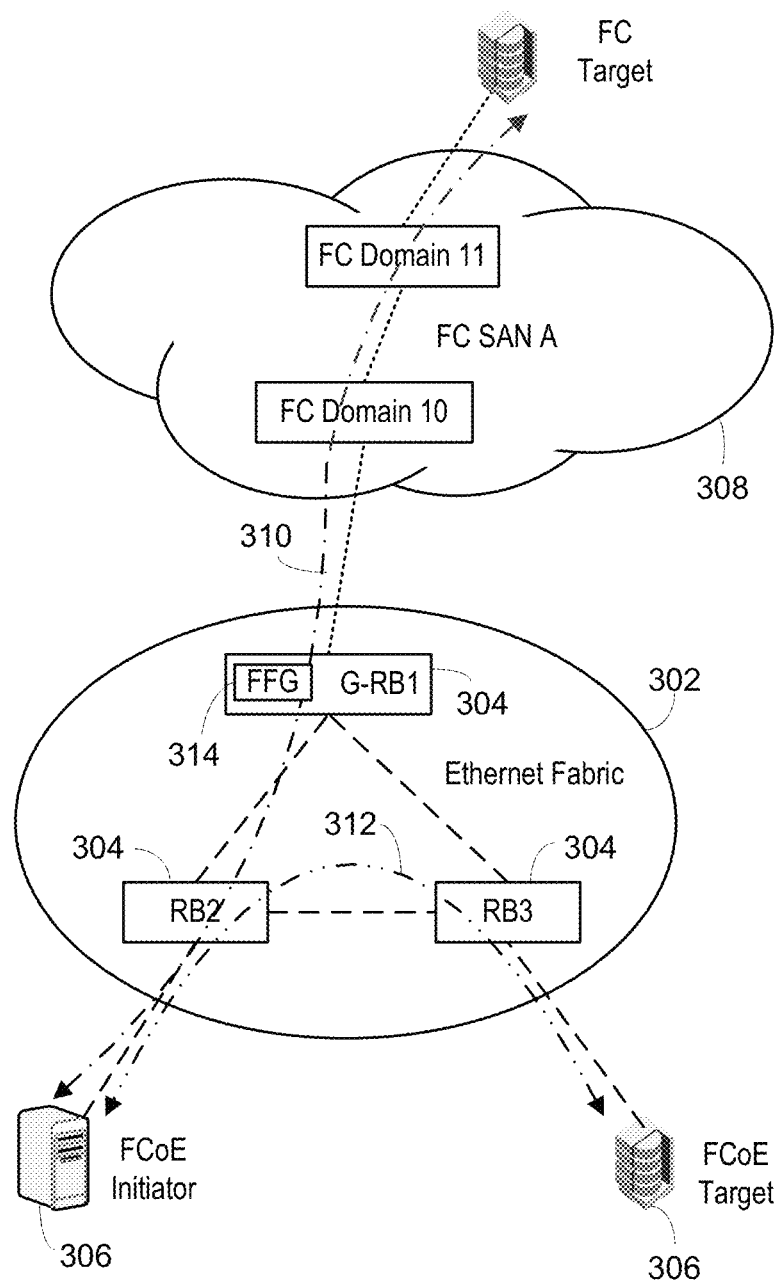
FIG. 3 is a block diagram of a network including an Ethernet Fabric according to the present invention.

FIG. 2 shows an FFG 102 with a Converged Enhanced Ethernet (CEE) chip 118 with 24 CEE interfaces and an FC chip 120 which has 8 FC ports functioning as N_Ports 112. VF_Ports 110 are created on top of CEE interfaces 122. Thus there are 24 VF_Ports 110 on the FFG 102 shown in FIG. 2. Interconnect 136 is a switching fabric that allows packet transfer between the various FC ports and CEE interfaces 122 as appropriate. In the preferred embodiment packets may transfer between an FC port and a CEE interface or between two CEE interfaces. CP 124 is the core processor on the FFG 102. Packets may be forwarded to the CP 124 from either the FC ports or the CEE interfaces and the CP 124 can provide packets to the FC ports or the CEE interfaces using either the interconnect 136 or through sideband connections, neither of which are shown for simplicity. A Gateway Daemon (GD) 126 is a user space or similar software module which implements and controls the FFG mode and runs on the CP 124. Routing table storage 138 is provided for use by the FC chip 120, the FCoE/CEE chip 118 and the CP 124. The tables in the routing table storage 138 are discussed in more detail below.

As shown in FIG. 2, FIP VLAN and FCF discovery and responses are trapped by the VF_Ports 110 and forwarded for handling by the GD 126 simulating an FCF as indicated by dashed lines 128. In the next phase, as indicated by the dashed lines 130, the device FIP FLOGIs/FDISCs are trapped on the VF_Ports and sent to the GD 126. The GD 126 converts FIP FLOGIs to FC FDISCs, as an initial FC FLOGI will have occurred on FG 102 startup; converts any FIP FDISCs to FC FDISCs; and sends the FC FDISCs to the FC fabric switch 108 over the appropriate mapped N_Ports 112 as indicated by the dashed lines 132. This FIP FLOGI conversion involves creating a new FC packet for the FDISC and copying over the device FLOGI into it. Thus, the GD 126 on the FFG 102 maintains a device login database and performs login translation. The FDISC responses from the FC fabric switch 108 are trapped on the ingress N_Ports 112 by the GD 126. These may need to be converted to FIP FLOGI or FIP FDISC responses, as necessary. These are copied into new FC packets and sent to the ENode devices 106 after conversion to a FIP FLOGI or FDISC response. An FC FDISC response from the FC switch 108 contains the FC_ID for the device, so the ENode device 106 now has a PID (Physical ID) assigned. For example, an FFG 102 N_Port 112 performs FLOGI to the FC fabric switch 108 and receives a base FC_ID of 0x010100. All subsequent device logins through this N_Port 112 receive FC-IDs as 0x010101, 0x010102 etc.

This FC FDISC response from the FC switch 108 is the trigger for setting up routes for the data path on the FFG 102. PLOGI and subsequent data frames from the ENode device 106 use the data path (shown via dash and dot lines 134 in FIG. 2). Once an ENode device 106 has logged into the FC SAN 104, the FFG 102 simply works as a pass-through module for data frames.

The data path utilizes Virtual Fabric Routing (VFR) within the switch. Data frames are moved between the CEE interfaces 122 and FC ports 120 with FCoE encapsulation and de-capsulation performed in the process.

The FFG 102 runs a significantly reduced set of FC Fabric services and these are managed by the GD 126. For example, an FC Name Server and an FC Management Server do not run on FFG 102. The GD 126 on the FFG 102 communicates with Fabric Services on an FC Switch 108 using FC-GS exchanges such as GMAL, GFN, RPAB, etc.

The FFG 102 provides graceful Failover/Failback for devices if the FC links 114 go down. The FFG 102 provides several value-added services if the peer FC switch 108 supports these, such as trunking the N_Ports, QoS support and WWN-based login balancing.

This is a general overview of the basic operation and functioning of an FFG that presents VF_Ports to the ENode devices and N_Ports to the FC fabric.

FIGS. 3-9 illustrate Ethernet Fabric operations according to the present invention. The preferred embodiment uses the VCS architecture from Brocade Communications Systems, Inc. More details on the VCS architecture are provided in U.S. Patent Application Publication Nos. 2011/0299391, 2011/0286357, 2011/0268125, 2011/0299535, 2011/0268120, and 2011/0292947, which are hereby incorporated by reference.

In the preferred embodiment the Ethernet Fabric 302 provides:

Support for NPIV-based N_Port to F_Port bridging between FCoE devices attached to the Ethernet Fabric and FC SAN attached devices, Access to FCoE and FC targets from a single ENode interface, Direct routing of FCoE to FCoE traffic without requiring a "trombone" from the Ethernet Fabric to the FC fabric and back to the Ethernet Fabric again, and The preferred embodiment permits the Ethernet Fabric 302 to be viewed as a single NPIV FCoE to FC Gateway (FFG). In addition, from the FCoE device point of view, the Ethernet Fabric 302 appears as a single logical FCF. All Ethernet Fabric switches, also known as RBridges or RBs, 304 use the same external FCF MAC address.

All FCoE devices 306 log into, and are members of, the FC SAN fabric 308. There is no separate, distinct FCoE SAN fabric. The Ethernet Fabric 302 handles the FIP protocol processing and the FCoE encapsulation between the Ethernet Fabric 302 and the FC fabric 308, but all SAN fabric services are provided by the FC SAN fabric 308 in the preferred embodiment.

Traffic between FCoE VN_Ports and FC N_Ports as shown by path 310 is bridged by an FFG switch functionality 314 embedded in an RBridge or Ethernet fabric switch connected directly to the FC SAN 308 connected to the FC fabric 308 via an FC N_Port to FC F_Port link. However, traffic between FCoE VN_Ports and FCoE VN_Ports is not forwarded to the FC Fabric for routing; it is TRILL forwarded directly from the ingress Ethernet Fabric switch 304 to the egress Ethernet Fabric switch 304 as shown by path 312 in FIG. 3. The RBs or Ethernet Fabric switches are interconnected using Ethernet Fabric ports.

For the sake of clarity, we need to distinguish between the two types of Ethernet Fabric switches that may exist in this model. An Ethernet Fabric switch (RB for RBridge) that includes an Ethernet Fabric FC N_Port to FC F_Port (Ethernet Fabric-FC link) connection is called a G-RB switch, for Gateway-RBridge, in this document (G-RB1 304 in FIG. 3) as they contain embedded FFG switch functionality. These G-RB switches may be at the access edge of the Ethernet Fabric (Top-of-rack—TOR), at an aggregation layer (middle-of-rack or end-of-row—MOR, EOR), or attached to existing edge and/or aggregation level RBs as required. These G-RB switches support the following standard FCoE-FC gateway services including:

FCoE device login service;

Login of G-RB N_Port to FC fabric;

Conversion of ENode FIP FLOGI and FDISC to FC FDISC;

Mapping of incoming FCoE frames to N_Port uplinks based on FC frame's SID Domain, Area;

FCoE encapsulation service, which is conversion of FCoE packets to FC frames and visa-versa; and FIP discovery and VLAN services for FCoE devices attached to this switch.

In addition, G-RB switches provide the following additional services:

Ethernet Fabric-FC link management;

Via Ethernet Name Server (eNS) distribution services, which is used to maintain coherency of information among the various RBs as discussed in Publication No. 2011/0299535 incorporated above, notify all other RBs of link establishment, status, etc. (Ethernet Fabric-FC link is identified by FC SAN Domain, Area); and Notify all other RBs of Ethernet Fabric-FC login count.

For deployments where the G-RBs are not deployed at the first Ethernet Fabric hop (TOR), RBs in the Ethernet Fabric that do not support a Ethernet Fabric-FC link (RB2 304 and RB3 304 in FIG. 3) provide the following services:

FIP discovery and VLAN services for FCoE devices attached to this switch;

FIP login redirection to the appropriate G-RB; and

Via the eNS distribution service, notify all other RBs of FCoE VN_Port additions and deletions.

At a high level, the forwarding logic for a received FCoE frame is:

Promote to L3;

Perform 24 bit lookup on FC DID;

Perform 16 bit (Domain, Area) lookup on FC SID;

If (24 bit lookup=hit):

Result=Forward to egress RB (or egress interface if egress RB=self);

Else (if 16 bit lookup=hit):

Result=Forward to egress G-RB (or egress interface if egress G-RB=self);

Else:

Drop packet.

In order to facilitate the direct forwarding of FCoE to FCoE traffic from ingress RB to egress RB in the Ethernet Fabric, each RB in the Ethernet Fabric has knowledge of every FCoE VN_Port attached to fabric, similar to the Ethernet Fabric model for L2 Ethernet MAC addresses.

When an FCoE Enode device successfully logs in to the FC SAN, the egress RB traps the FIP login response and updates all RBs of the new device's FPMA MAC using the eNS distribution service. This eNS update includes a flag indicating that this is an FCoE VN_Port MAC, and rather than installing an entry in the L2 tables, each RB installs a 24 bit FCoE DA entry using the low order three bytes of the VN_Port FPMA MAC address as these correspond to the FC PID of the VN_Port. This allows any FCoE frame ingressing on any RB in the fabric, destined to the VN_Port, to be directly forwarded to the egress RB, the RB to which the VN_Port is attached.

Upon establishment of an N_Port to F_Port link from an RB in the Ethernet Fabric to the FC SAN (an Ethernet Fabric-FC link) the RB notifies all RBs in the Ethernet Fabric of the link establishment via the eNS distribution service. The link is identified by the FC Domain and Area assigned by the FC fabric to the G-RB N_Port in response to the G-RB FLOGI. Each RB installs an FCoE ACL entry to facilitate a 16 bit FC SID Domain, Area based lookup with the result being forwarded to the RB owning the N_Port to F_Port link, or to the egress interface if this is the owning RB. It is noted that the lookup to determine if the packet is destined to a VN_Port or ENode connected to the Ethernet Fabric has precedence over these lookups which route the packet to the G-RB.

With these two sets of entries, lower 24 bits of FCoE DA for each connected ENode and 16 bit Domain, Area for each connected N_Port, added to the normal Ethernet Fabric routing tables, in the Ethernet Name Server and other tables in the switch as described in Publication No. 2011/0299535 incorporated above, all FCoE packets from ENodes or FC packets from the FC fabric can be properly routed to the correct egress port of the Ethernet Fabric.

FIGS. 4 to 7 illustrate data flow for four cases, respectively FCoE host to FC target, FC target to FCoE host, FCoE host to FCoE target on a different RB and FCoE host to FCoE target on the same RB.

Figure 4:
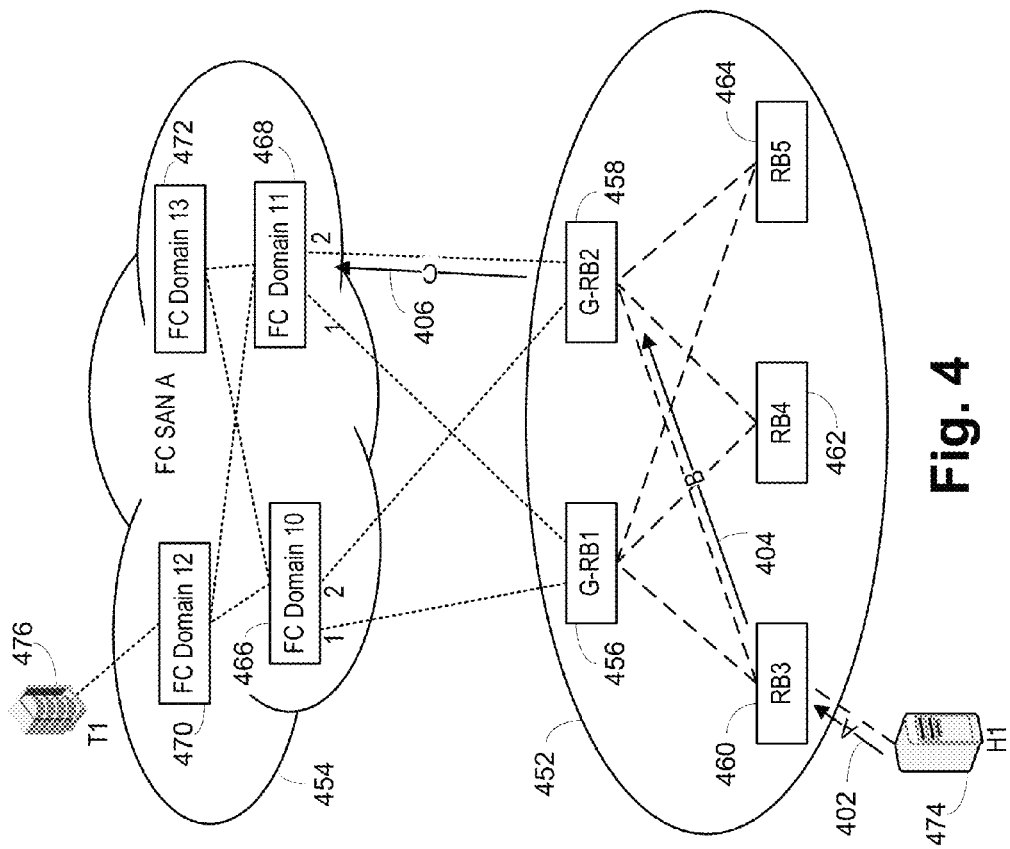
FIG. 4 is a block diagram illustrating FCoE VN_Port to FC N_Port operations according to the present invention.

Referring to FIG. 4, an exemplary network architecture is illustrated. An Ethernet Fabric 452 is connected to an FC SAN 454. The Ethernet Fabric 452 includes various interconnected switches. Switch G-RB1 456 is connected to switch G-RB2 458. Switch G-RB1 456 and switch G-RB2 458 include FFG functionality as indicated by the G-designation. Switch G-RB1 456 and switch G-RB2 458 also act as RBridges in the Ethernet Fabric as indicated by the RB designation. Switches RB3 460, RB4 462 and RB5 464 are each connected to each of switches G-RB1 456 and G-RB2 458 to form the Ethernet Fabric 452.

The FC SAN 454 is formed by FC switches 466, 468, 470 and 472, each switch including exemplary domain values. FC switches 466 and 468 are shown as each having two ports for connection to the Ethernet Fabric 452, with port 1 being connected to switch G-RB1 456 and port 2 being connected to switch G-RB2 458. An FCoE host H1 474 is shown connected to switch RB3 460, while FC target T1 476 is shown as connected to switch 470, which has domain 12. This basic illustrated architecture is used in variations in FIGS. 4-9 to illustrate packet flow in various situations.

In FIG. 4 data flow from FCoE host H1 474 to FC target T1 476 is illustrated. Assume FCoE host H1 474 is logged into FC Domain 11 468, port (area) 2. Also assume there is a single external FCF MAC for the Ethernet Fabric 452 which is programmed as a "Ext FCF MAC" on all RBridges in the Ethernet Fabric 452. Further assume that the Ethernet Fabric switches 456-464 each use an individual, internal FCF MAC value for ingress RBridge to egress RBridge/AG FCoE traffic. FCoE host H1 474 provides an FCoE packet to switch RB3 460 as illustrated by the arrow A 402. The FCoE packet has the following values: DA: Ext FCF MAC, SA: H1 VN FPMA MAC, VID: FCoE VLAN, DID: T1 FCID and SID: H1 FCID.

Switch RB3 460 performs the following processing on the packet:
1. Promote to L3 (Because DA=Ext FCF MAC). The promotion to L3 results in using different fields for routing, in this case either the DID or SID fields in the embedded packet.
2. 24 bit DID lookup=miss (because the destination is not an FCoE device connected to the Ethernet Fabric 452)
3. 16 bit SID lookup=hit (because it is a known FC ENode device), result=forward to switch G-RB2 458 (because of routing table entry)
4. TRILL forward to switch G-RB2 458 (normal Ethernet Fabric operation)

The Ethernet Fabric packet is forwarded from switch RB3 460 to switch G-RB2 458 as illustrated by arrow B 404. The packet has the following values: TRILL DA=G-RB2, TRILL SA=RB3, Inner DA=G-RB2 int FCF MAC, Inner SA=RB3 int FCF MAC, VID=FCoE VLAN, DID=T1 FCID and SID=H1 FCID Switch G-RB2 458 performs the following processing on the packet:
1. Terminate TRILL (because TRILL DA=G-RB2)
2. Promote to L3 (because DA=My Int FCF MAC)
3. 24 bit DID lookup=miss (because the destination is not an FCoE device connected to the Ethernet Fabric 452)
4 16 bit SID lookup=hit (because it is a known FCoE ENode device), result=forward to FC (EGID) port (because of routing table entry).

The FFG functionality or entity embedded in switch G-RB2 458 decapsulates the FCoE packet to produce the FC packet. The FC packet is provided from switch G-RB2 458 to port 2 of switch 468 as illustrated by arrow C 406. The FC packet has the following values: DID=T1 FCID and SID=H1 FCID. Flow inside the FC SAN 454 is as normal and is not illustrated.

Figure 5:
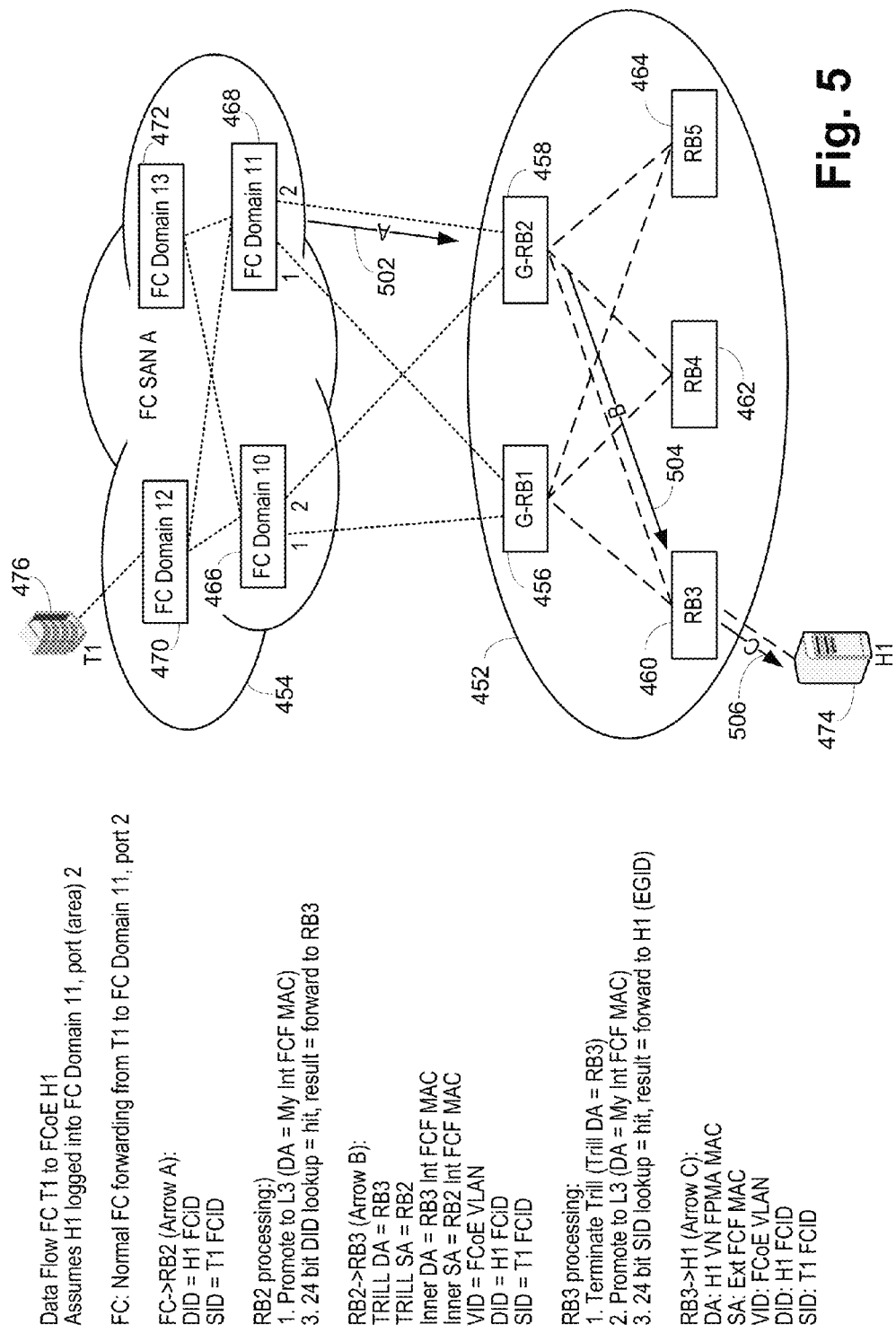
FIG. 5 is a block diagram illustrating FC N_Port to FCoE VN_Port operations according to the present invention.

In FIG. 5 data flow from FC target T1 476 to FCoE host H1 474 is illustrated. Again assume FCoE host H1 474 is logged into FC domain 11, port (area) 2. Normal FC forwarding occurs on the FC packet from FC target T1 476 to FC switch 468, domain 11, port 2. Because FC switch 468 assumes the FCoE host H1 is connected through port 2, the FC packet flows from FC switch 468 to switch G-RB2 458 as shown by arrow A 502. The FC packet has the following values: DID=H1 FCID and SID=T1 FCID. The FFG functionality embedded in switch G-RB2 458 encapsulates the FC packet to produce the FCoE packet with a DA of switch G-RB2 458 Int FCF MAC address and a null SA address as the RB function will supply a proper SA on transmission.

Switch G-RB2 458 performs the following processing on the packet:
1. Promote to L3 (because DA=My Int FCF MAC)
2. 24 bit DID lookup=hit (because the destination is an FCoE device connected to the Ethernet Fabric 452), result=forward to RB3 460 (because of the routing table entry)

The Ethernet Fabric packet is provided from switch G-RB2 458 to switch RB3 460 as illustrated by arrow B 504. The Ethernet Fabric packet has the following values: TRILL DA=RB3, TRILL SA=G-RB2, Inner DA=RB3 int FCF MAC, Inner SA=G-RB2 int FCF MAC, VID=FCoE VLAN, DID=H1 FCID and SID=T1 FCID.

Switch RB3 460 performs the following processing:
1. Terminate Trill (because TRILL DA=RB3)
2. Promote to L3 (because DA=My Int FCF MAC)
3. 24 bit DID lookup=hit (because the destination is an FCoE device connected to the Ethernet Fabric 452), result=forward to H1 (EGID) port (because of the routing table entry)

The FCoE packet is provided from switch RB3 460 to FCoE host H1 474 illustrated by arrow C 506. The FCoE packet has the following values: DA: H1 VN FPMA MAC, SA: Ext FCF MAC, VID: FCoE VLAN, DID: H1 FCID and SID: T1 FCID.

In FIG. 6 data flow from FCoE host H1 474 to FCoE target T3 478, an FCoE target directly connected to the Ethernet Fabric 452. The FCoE host H1 474 provides a packet to switch RB3 460 as illustrated by arrow A 602. The FCoE packet has the following values: DA: Ext FCF MAC, SA: H1 VN FPMA MAC, VID: FCoE VLAN, DID: T3 FCID and SID: H1 FCID.

Switch RB3 460 processes the FCoE packet as follows:
1. Promote to L3 (because DA=Ext FCF MAC)
2. 24 bit DID lookup=hit (because the destination is an FCoE device connected to the Ethernet Fabric 452), result=forward to switch RB5 464 (because of the routing table entry)
3. TRILL forward to RB5

The TRILL packet from switch RB3 460 flows to switch G-RB1 456 as shown by arrow B 604 and then to switch RB5 as shown by arrow C 606. This is normal TRILL forwarding inside the Ethernet Fabric 452. The TRILL packet has the following values: TRILL DA=RB5, TRILL SA=RB3, Inner DA=RB5 int FCF MAC, Inner SA=RB3 int FCF MAC, VID=FCoE VLAN, DID=T3 FCID and SID=H1 FCID.

Upon receipt of the TRILL packet switch G-RB1 performs normal TRILL forwarding. Upon receipt of the TRILL packet switch RB5 464 performs the following processing:
1. Terminate TRILL (because TRILL DA=RB5)
2. Promote to L3 (because DA=RB5 int FCF MAC)
3. 24 bit SID lookup=hit (because the destination is an FCoE device connected to the Ethernet Fabric 452), result=forward to T1 (EGID) port (because of the routing table entry)

The FCoE packet flows from switch RB5 464 to FCoE target T1 478 as shown by arrow D 608. The FCoE packet has the following values: DA: T3 VN FPMA MAC, SA: Ext FCF MAC, VID: FCoE VLAN, DID: T3 FCID and SID: H1 FCID.

In FIG. 7 data flow from FCoE host H1 474 to FCoE target T2 480 connected to the same switch in the Ethernet Fabric 452 is illustrated. The FCoE packet flows from FCoE host H1 474 to switch RB3 460 as shown by arrow A 702. The FCoE packet has the following values: DA: Ext FCF MAC, SA: H1 VN FPMA MAC, VID: FCoE VLAN, DID: T2 FCID and SID: H1 FCID.

Switch RB3 460 processes the packet as follows:
1. Promote to L3 (because DA=Ext FCF MAC)
2. 24 bit SID lookup=hit (because the destination is an FCoE device connected to the Ethernet Fabric 452), result=forward to T2 (EGID) port (because of the routing table entry)

The FCoE packet flows from switch RB3 460 to FCoE target T2 480 as shown by arrow B 704. The FCoE packet has the following values: DA: T2 VN FPMA MAC, SA: Ext FCF MAC, VID: FCoE VLAN, DID: T2 FCID and SID: H1 FCID.

FIG. 8 illustrates the FIP VLAN and FIP FCF discovery operations. For FIP VLAN discovery, the FIP Request is provided from FCoE host H1 474 to switch RB3 460 as shown by arrow A 802. The FIP Request packet has the following values: DA: ALL_FCFs_MAC, SA: H1 ENode MAC and VID: Any valid VLAN.

Switch RB3 460 performs the following processing:
1. Trap to CP (because it is a FIP packet)
2. CP generates FIP VLAN Notification (because it is acting as the FCF entity)

The FIP Notification flows from switch RB3 460 to FCoE host H1 474 as shown by arrow B 804. The FIP Notification packet has the following values: DA: H1 ENode MAC, SA: Ext FCF MAC and VID: Same as Request.

For FIP Discovery, the FIP Solicitation packet flows from FCoE host H1 474 to switch RB3 460 as shown by arrow A 802. The FIP Discovery packet has the following values: DA: ALL_FCFs_MAC, SA: H1 ENode MAC and VID: VCS FCoE VLAN.

Switch RB3 460 performs the following processing:
1. Trap to CP (because it is a FIP packet)
2. CP generates FIP Solicited Advertisement (because it is acting as the FCF entity)

The FIP Solicited Advertisement packet flows from switch RB3 460 to FCoE host H1 474 as shown by arrow B 804. The FIP Solicited Advertisement packet has the following values: DA: H1 ENode MAC, SA: Ext FCF MAC and VID: FCoE VLAN.

FIG. 9 illustrates the FIP FLOGI or FDISC operations. The FIP Virtual Link Instantiation (VLI) Login (FLOGI or FDISC) operations are as follows. Assume that FCOE host H1 474 is logging into FC Domain 11, Port 2 on switch 468. The FIP VLI Request packet flows from FCoE host H1 to switch RB3 460 as shown by arrow A 902. The FIP VLI Request packet has the following values: DA: Ext FCF MAC, SA: H1 ENode MAC, VID: FCoE VLAN, DID: FFFFFE and SID: 000000.

The switch RB3 460 performs the following processing:
1. Trap to CP (because it is a FIP packet as determined by an FIP Ethernet type trap)
2. Use Login Management as described below to determine egress RB for the packet
3. TRILL forward to egress RB (normal TRILL forwarding)

The TRILL packet flows from switch RB3 460 to switch G-RB2 458 as shown by arrow B 904. The TRILL packet has the following values: TRILL DA=G-RB2, TRILL SA=RB3, Inner DA=G-RB2 int FCF MAC, Inner SA=H1 ENode MAC, VID=FCoE VLAN, DID: FFFFFE and SID: 000000.

As switch G-RB2 458 is acting as the FFG functionality, it performs the following login processing:
1. Normal FCoE-FC gateway FLOGI/FDISC processing (with the switch G-RB2 458 presenting as an FC N_Port, most preferably a port that has NPIV or Virtual N_Port capabilities). In this case the switch G-RB2 458 converts the FIP FLOGI to an FC FDISC.

Thus the FDISC flows from the switch G-RB2 458 to switch 468 (FC Domain 11) as shown by arrow C 906.

FC switch 468 responds to the FC FDISC from switch G-RB2 458 by returning either an FC LS-ACC (successful login) or FC LS-RJT as shown by arrow D 908.

Switch G-RB2 458 performs the following response processing:
1. Normal FCoE-FC AG FLOGI/FDISC processing.

In this case the switch G-RB2 458 creates the FCoE FIP Response packet and provides it to switch G-RB3 460 as shown by arrow E 910. The TRILL packet has the following values: TRILL DA=RB3, TRILL SA=RB2, Inner DA=H1 Enode MAC, Inner SA=RB2 Int FCF MAC, VID=FCoE VLAN, DID=H1 FCID, SID=FFFFFE Switch RB3 460 performs the following response processing:
1. Trap to CP (because it is a FIP packet as determined by an FIP Ethernet type trap)
2. Decode response
3a: If Link Service Accept (LS ACC), send eNS update to all RBs If the response is an LS_ACC, then switch RB3 460 provides an eNS notification to all RBs as shown by arrows F 912.

All RBs perform the following response to the eNS notification:
3a.1. Normal MAC address update processing
3a.2. New FCoE VN_Port processing. Each RB adds an FCoE EXM entry using low order 3 bytes of VN_Port MAC address as FCID to indicate presence of ENode on the Ethernet Fabric 452.
4. Forward response to H1

The FIP VLI Response flows from switch RB3 460 to ENode host H1 474 as shown by arrow G 914. This FCoE FIP packet has the following values: DA: H1 ENode MAC, SA: Ext FCF MAC, VID: FCoE VLAN, DID=H1 FCID, SID=FFFFFE.

In a deployment where the G-RB is not at the first Ethernet Fabric hop, the first hop RB must decide to which G-RB it should forward FCoE Enode device FIP FLOGIs. In one embodiment an automatic method is used. In a second embodiment, a configurable FCoE login management model is used.

The automatic embodiment utilizes the eNS distribution services to provide updates from G-RBs to all other RBs with current Ethernet Fabric-FC link usage information. If the G-RB is the first hop, then if a single logical FC N_Port to F_Port link (Ethernet Fabric-FC link) is established on the G-RB, forward the FC FLOGI on it. If multiple logical Ethernet Fabric-FC links are established on this G-RB, forward an Ethernet Fabric FLOGI on the Ethernet Fabric-FC link with the least number of FCoE device logins per link bandwidth. If a G-RB is not the first hop, then send the FLOGI to the G-RB with the least number of Ethernet Fabric-FC logins per total uplink bandwidth. Note that FDISC based login from the same ENode must be sent to the same G-RB and forwarded on the same Ethernet Fabric-FC link, so the ENode to G-RB association must be retained in the first hop non-G-RB.

The second embodiment provides the SAN administrator with a facility to map ENode devices to a specific Ethernet Fabric-FC link, and therefore to a specific FC SAN Domain, Area. The resulting login management database is distributed to all RBs in the Ethernet Fabric.

By embedding FCoE to FC gateway functionality into the switches or RBridges that form an Ethernet Fabric the entire Ethernet Fabric can act as a virtual gateway, providing VF_Ports to the ENodes and N_Ports to the FC fabric, and can route FCoE packets directly between connected ENode devices without a trip to the FC fabric.

Figure 10:
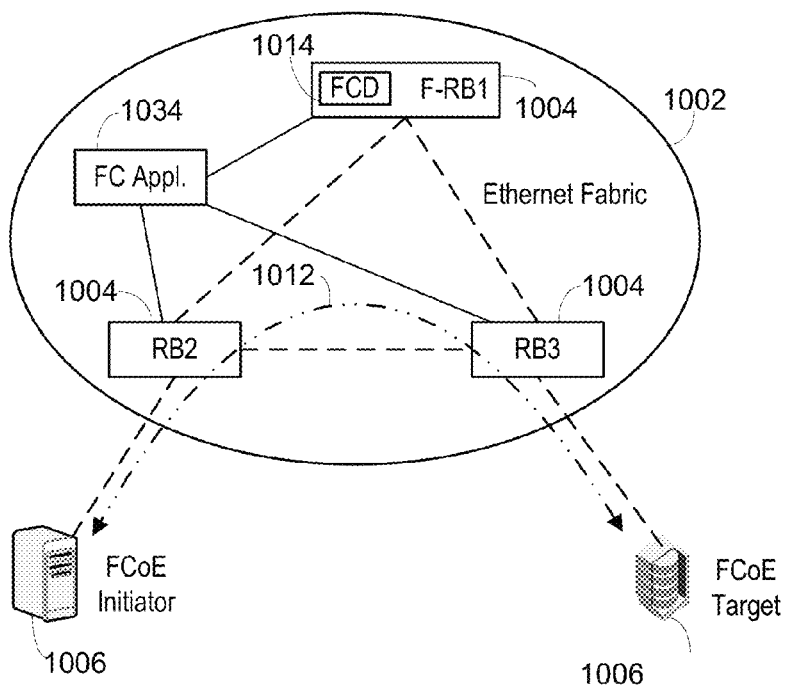
FIG. 10 is a block diagram of a first alternate network including an Ethernet Fabric according to the present invention.

If operation of an FCoE-only network without connection to an FC fabric is desired, in a first embodiment shown in FIG. 10, the FIP conversion and forwarding functions of the G-RB can be provided by an FC services daemon 1014 provided in an F-RB1 1004 or FC services appliance 1034, the FC services daemon 1014 or FC services appliance 1034 providing all necessary FC operations, including the Name Server function, to allow ENodes 1006 to receive FCIDs. FIP VLI Login operations received at the RBs 1004, such as RB2 and RB3, are directed to the F-RB3 1004 containing the FC services daemon 1014 or the FC services appliance 1034 instead of an N_Port of a G-RB. This allows the RBs to develop the eNS entries for the ENodes to allow direct routing of the FCoE packets such as path 1012 in this FCoE-only, no FC fabric embodiment.

Figure 11:
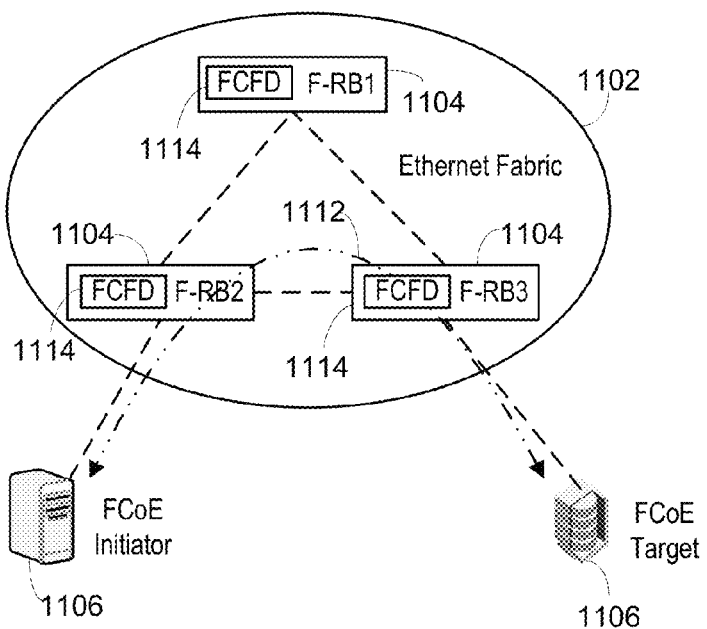
FIG. 11 is a block diagram of a second alternate network including an Ethernet Fabric according to the present invention.

In a second alternate embodiment illustrated in FIG. 11, each RB 1104 in the Ethernet Fabric 1102 includes an FCF daemon 1114 (FCFD) and so is referred to as an F-RB. The FCF daemon 1114 provides all FC services normally provided by an FCF, which is sufficient to operate an FC fabric. In this embodiment, rather than each RB 1104 forwarding FIP VLI operations to another RB 1104 or an FC services appliance, each RB 1104 handles the login operations of its connected ENodes 1106 as it contains full FC services. eNS can be used as above to maintain the tables used for direct routing such as path 1112 or similar FC inter-switch communications can be used, as those will be provided to allow the FCF daemons 1114 to operate as a normal FC fabric.

While certain specific embodiments of particular functions have been mentioned, in most cases other similar embodiments that perform the same function can be used. For example, eNS is described as providing message distribution services between the Ethernet Fabric switches but other message distribution methods and protocols could be used. As another example, the GD is described as a user space module, language usually used with Linux/Unix variants, but it could be a kernel module in Linux/Unix or could be the equivalent in Windows, VxWorks and the like.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An Ethernet Fabric comprising:
a plurality of interconnected switches, at least one of said plurality of interconnected switches for connection to a Fibre Channel over Ethernet (FCoE) ENode, at least one of said plurality of interconnected switches for connection to a Fibre Channel (FC) fabric, said at least one FC fabric-connected switch for connection to the FC fabric with an N_Port and including FCoE to FC gateway functionality, each of said plurality of interconnected switches including a table for storage of all ENodes connected to the Ethernet Fabric and all N_Ports connected to the FC fabric,
wherein all switches for connection to ENodes trap any FCoE Initialization Protocol (FIP) F Port Login (FLOGI) or (Discover F Port Parameters (FDISC) Link Service Accept (LS_ACC) packet directed to a connected ENode, add a table entry of the connected ENode and inform all other switches in the Ethernet Fabric of the connected ENode address,
wherein all switches for connection to the FC fabric log into the FC fabric, add a table entry of the connected N_Port and inform all other switches of the FC domain and area of the connected N_Port,
wherein any switch connected to an ENode routes FCoE packets to the proper N_Port based on domain and area values in said table,
wherein any switch connected to the FC fabric routes packets received from the FC fabric to the proper ENode based on addresses of ENodes in said table, and
wherein any switch connected to an ENode routes FCoE packets to the proper ENode based on addresses of ENodes in said table.

2. The Ethernet Fabric of claim 1, wherein any switch connected to an ENode generates responses to FIP Discovery requests and forwards FIP Virtual Link Instantiation (VLI) requests to an entity which provides FC addresses.

3. The Ethernet Fabric of claim 2, wherein the entity which provides FC addresses is an FC switch in the FC fabric so that the FIP VLI packets are routed to a switch connected to the FC fabric.

4. An Ethernet Fabric switch comprising:
a control processor;
an Ethernet port configured for Fibre Channel over Ethernet (FCoE) operation for connection to an ENode;
an Fibre Channel (FC) port configured for connection to an FC fabric as an N_Port;
an Ethernet Fabric port for connection to another Ethernet Fabric switch to allow development of an Ethernet Fabric;

an interconnect to connect said control processor, said Ethernet port, said Ethernet Fabric port and said FC port; and routing table storage coupled to said control processor, said Ethernet port, said Ethernet Fabric port and said FC port, wherein said control processor, said Ethernet port, said Ethernet Fabric port and said FC port cooperate to act as an FCoE to FC gateway, wherein said control processor, said Ethernet port, said Ethernet Fabric port and said FC port cooperate as needed to trap any FCoE Initialization Protocol (FIP) F Port Login (FLOGI) or (Discover F Port Parameters (FDISC) Link Service Accept (LS_ACC) packet directed to a connected ENode, add a table entry of the connected ENode and inform any other switches in the Ethernet Fabric of the connected ENode address, wherein said control processor, said Ethernet Fabric port and said FC port cooperate as needed to log into the FC fabric, add a table entry of the connected N_Port and inform all other switches in the Ethernet Fabric of the FC domain and area of the connected N_Port, wherein said control processor, said Ethernet port, said Ethernet Fabric port and said FC port cooperate as needed to route FCoE packets to the proper N_Port based on domain and area values in said table, wherein said control processor, said Ethernet port, said Ethernet Fabric port and said FC port cooperate as needed to route packets received from the FC fabric to the proper ENode based on addresses of ENodes in said table, and wherein said control processor, said Ethernet port and said Ethernet Fabric port cooperate as needed to route FCoE packets to the proper ENode based on addresses of ENodes in said table.

5. The Ethernet Fabric switch of claim 4, said control processor, said Ethernet port, said Ethernet Fabric port and said FC port cooperate as needed to generate responses to FIP Discovery requests and forward FIP Virtual Link Instantiation (VLI) requests to the entity which provides FC addresses.

6. The Ethernet Fabric switch of claim 5, wherein the entity which provides FC addresses is an FC switch in the FC fabric so that the FIP VLI packets are routed to an Ethernet Fabric switch connected to the FC fabric.

7. An Ethernet Fabric comprising:
a plurality of interconnected switches, at least one of said plurality of interconnected switches for connection to a Fibre Channel over Ethernet (FCoE) ENode, each of said plurality of interconnected switches including a table for storage of all ENodes connected to the Ethernet Fabric, wherein all switches for connection to ENodes trap any FCoE Initialization Protocol (FIP) F Port Login (FLOGI) or (Discover F Port Parameters (FDISC) Link Service Accept (LS_ACC) packet directed to a connected ENode, add a table entry of the connected ENode and inform all other switches in the Ethernet Fabric of the connected ENode address, and wherein any switch connected to an ENode routes FCoE packets to the proper ENode based on addresses of ENodes in said table.

8. The Ethernet Fabric of claim 7, wherein any switch connected to an ENode generates responses to FIP Discovery requests and forwards FIP Virtual Link Instantiation (VLI) requests to an entity which provides FC addresses.

9. An Ethernet Fabric switch comprising:
a control processor;
an Ethernet port configured for Fibre Channel over Ethernet (FCoE) operation for connection to an ENode;
an Ethernet Fabric port for connection to another Ethernet Fabric switch to allow development of an Ethernet Fabric;
an interconnect to connect said control processor, said Ethernet port and said Ethernet Fabric port; and
routing table storage coupled to said control processor, said Ethernet port and said Ethernet Fabric port, wherein said control processor, said Ethernet port and said Ethernet Fabric port cooperate as needed to trap any FCoE Initialization Protocol (FIP) F Port Login (FLOGI) or (Discover F Port Parameters (FDISC) Link Service Accept (LS_ACC) packet directed to a connected ENode, add a table entry of the connected ENode and inform any other switches in the Ethernet Fabric of the connected ENode address, and wherein said control processor, said Ethernet port and said Ethernet Fabric port cooperate as needed to route FCoE packets to the proper ENode based on addresses of ENodes in said table.

10. The Ethernet Fabric switch of claim 9, said control processor, said Ethernet port and said Ethernet Fabric port cooperate as needed to generate responses to FIP Discovery requests and forward FIP Virtual Link Instantiation (VLI) requests to an entity which provides FC addresses.

11. A method of operating an Ethernet Fabric comprising:
interconnecting a plurality of switches, at least one of said plurality of interconnected switches for connection to a Fibre Channel over Ethernet (FCoE) ENode, at least one of said plurality of interconnected switches for connection to a Fibre Channel (FC) fabric, said at least one FC fabric-connected switch for connection to the FC fabric with an N_Port and including FCoE to FC gateway functionality, each of said plurality of interconnected switches including a table for storage of all ENodes connected to the Ethernet Fabric and all N_Ports connected to the FC fabric, trapping any FCoE Initialization Protocol (FIP) F Port Login (FLOGI) or (Discover F Port Parameters (FDISC) Link Service Accept (LS_ACC) packet directed to a connected ENode by all switches for connection to ENodes, adding a table entry of the connected ENode and informing all other switches in the Ethernet Fabric of the connected ENode address, logging into the FC fabric by all switches for connection to the FC fabric, adding a table entry of the connected N_Port and informing all other switches of the FC domain and area of the connected N_Port, routing FCoE packets to the proper N_Port based on domain and area values in said table by any switch connected to an ENode, routing packets received from the FC fabric to the proper ENode based on addresses of ENodes in said table by any switch connected to the FC fabric, and routing FCoE packets to the proper ENode based on addresses of ENodes in said table by any switch connected to an ENode.

12. The method of claim 11, further comprising:
generating responses to FIP Discovery requests by any switch connected to an ENode; and
forwarding FIP Virtual Link Instantiation (VLI) requests to an entity which provides FC addresses by any switch connected to an ENode.

13. The method of claim 12, wherein the entity which provides FC addresses is an FC switch in the FC fabric so that the FIP VLI packets are routed to a switch connected to the FC fabric.

14. A method of operating an Ethernet Fabric switch comprising:
   acting as a Fibre Channel over Ethernet (FCoE) to Fibre Channel (FC) gateway;
   trapping any FCoE Initialization Protocol (FIP) F Port Login (FLOGI) or (Discover F Port Parameters (FDISC) Link Service Accept (LS_ACC) packet directed to a connected ENode;
   adding a routing table entry of the connected ENode;
   informing any other switches in the Ethernet Fabric of the connected ENode address;
   logging into the FC fabric as an N_Port;
   adding a routing table entry of the connected N_Port;
   informing all other switches in the Ethernet Fabric of the FC domain and area of the connected N_Port;
   routing FCoE packets to the proper N_Port based on domain and area values in said routing table;
   routing packets received from the FC fabric to the proper ENode based on addresses of ENodes in said routing table; and
   routing FCoE packets to the proper ENode based on addresses of ENodes in said table.

15. The method of claim 14, further comprising:
   generating responses to FIP Discovery requests; and
   forwarding FIP Virtual Link Instantiation (VLI) requests to an entity which provides FC addresses.

16. The method of claim 15, wherein the entity which provides FC addresses is an FC switch in the FC fabric so that the FIP VLI packets are routed to an Ethernet Fabric switch connected to the FC fabric.

17. A method of operating an Ethernet Fabric comprising:
   interconnecting a plurality of interconnected switches, at least one of said plurality of interconnected switches for connection to a Fibre Channel over Ethernet (FCoE) ENode, each of said plurality of interconnected switches including a table for storage of all ENodes connected to the Ethernet Fabric;
   trap any FCoE Initialization Protocol (FIP) F Port Login (FLOGI) or (Discover F Port Parameters (FDISC) Link Service Accept (LS_ACC) packet directed to a connected ENode by all switches for connection to ENodes, adding a table entry of the connected ENode and informing all other switches in the Ethernet Fabric of the connected ENode address, and
   routing FCoE packets to the proper ENode based on addresses of ENodes in said table by any switch connected to an ENode.

18. The method of claim 17, further comprising:
   generating responses to FIP Discovery requests by any switch connected to an ENode; and
   forwarding FIP Virtual Link Instantiation (VLI) requests to an entity which provides FC addresses.

19. A method of operating an Ethernet Fabric switch comprising:
   a control processor;
   an Ethernet port configured for Fibre Channel over Ethernet (FCoE) operation for connection to an ENode;
   an Ethernet Fabric port for connection to another Ethernet Fabric switch to allow development of an Ethernet Fabric;
   an interconnect to connect said control processor, said Ethernet port and said Ethernet Fabric port; and
   routing table storage coupled to said control processor, said Ethernet port and said Ethernet Fabric port,
   wherein said control processor, said Ethernet port and said Ethernet Fabric port cooperate as needed to
   trapping any FCoE Initialization Protocol (FIP) F Port Login (FLOGI) or (Discover F Port Parameters (FDISC) Link Service Accept (LS_ACC) packet directed to a connected ENode; adding a routing table entry of the connected ENode;
   informing any other switches in the Ethernet Fabric of the connected ENode address; and
   routing FCoE packets to the proper ENode based on addresses of ENodes in said routing table.

20. The method of claim 19, further comprising:
   generating responses to FIP Discovery requests; and
   forwarding FIP Virtual Link Instantiation (VLI) requests to an entity which provides FC addresses.

* * * * *